(Model.)
J. W. ROSS.
Kitchen Implement.
No. 241,822. Patented May 24, 1881.
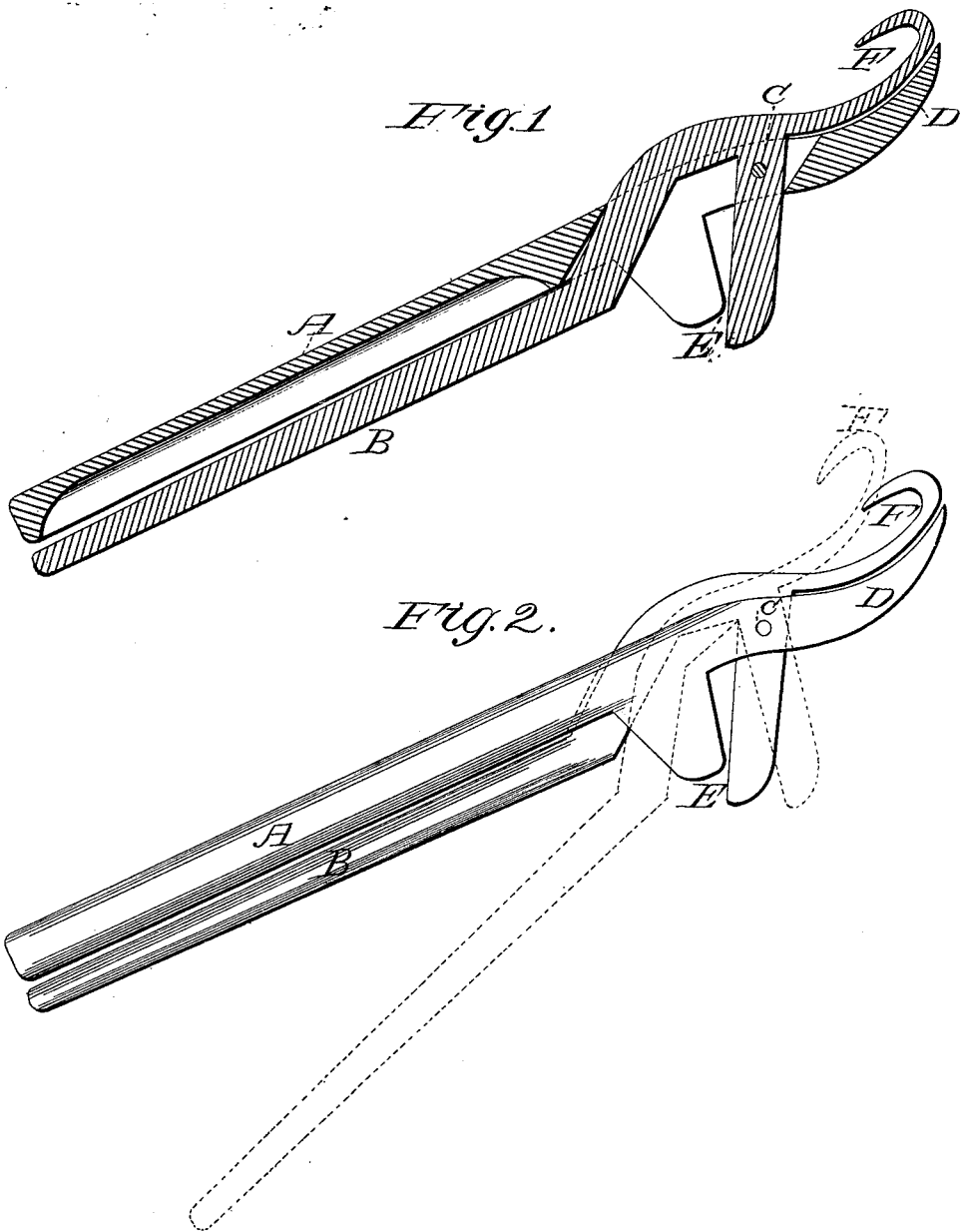
Witnesses:
Michael Myers
David J. Talbot
Inventor:
John Wesley Ross
N. PETERS, Photo-Lithographer, Washington, D. C.

UNITED STATES PATENT OFFICE.

JOHN W. ROSS, OF SANTA CLARA, CALIFORNIA.

KITCHEN IMPLEMENT.

SPECIFICATION forming part of Letters Patent No. 241,822, dated May 24, 1881.

Application filed September 16, 1880. (Model.)

*To all whom it may concern:*

Be it known that I, JOHN WESLEY ROSS, a citizen of the United States, residing at Santa Clara, in the county of Santa Clara and State of California, have invented a new and useful improvement in implements for handling, while in a heated state, the movable parts of a stove, and also the cooking utensils belonging to a kitchen; and I do hereby declare that the following is a full, clear, and exact description of the invention, which will enable others skilled in the art to which it appertains to make and use the same.

My invention consists in forming and uniting two peculiarly-shaped levers, A and B, either wholly or partly of metal, provided with a hook, pivoted and constructed substantially as shown by the accompanying drawings, and for the purposes hereinafter specified.

The nature, design, operation, and utility of the invention may be readily understood by a reference to the drawings, in which—

Figure 1 represents a central longitudinal section, and Fig. 2 a side view.

The two levers are united by passing B through a slot in A, as shown, and pivoting them with a pin at C.

It will be seen that the form and combination of the levers A and B are such as to give two sets of jaws, D and E, the latter of which is bifurcated or doubled in one member, affording a secure hold when used to tilt or lift a vessel. These pairs of jaws are oppositely placed with respect to the pivot, and are oppositely inclined for convenience of operation. The hook F on lever B is designed for lifting vessels that are supplied with bails, and for hanging up the device when not in use.

The device is operated as follows: By taking hold of the handle of lever A, which has the precise form needed for a stove-lid lifter, the lever B by the force of gravity will assume the relation to A shown by dotted lines in Fig. 2 of the drawings, which entirely relieves the lever A from interference in that office.

The jaws D are adapted to gripe any shallow plate, pan, or grate in the oven, and also for handling cast-iron gem-pans, so difficult to manage with a cloth, on account of the extraordinary heat to which they are necessarily subjected when good baking is done in them.

The jaws E are for griping the edge of pots and kettles when it is desired to tilt them. This has usually been done by taking the bail in the left hand, and grasping the edge of the vessel with the right hand, with a cloth beneath the fingers, and turning the opposite edge of the vessel down, while the hand is unprotected from the rising steam, except when pains is taken to wind a cloth around it. By means of this device the vessel may be lifted by the bail, if heavy, or, if not heavy, simply by griping the edge of the vessel with the jaws E, as the ends of the levers A and B in the hand form a temporary but secure handle for emptying kettles of their steaming contents without exposing or soiling the hands.

By turning the device upside down the jaws D will be found adapted to the handling of a different class of vessels—viz., those of a larger size than pie-pans and plates whose sides are nearly or entirely vertical, such as deep pans and small kettles.

What I desire to claim and secure by Letters Patent is—

The levers A and B, with the jaws D and E and the hook F, formed and combined substantially as shown, and for the purposes set forth.

JOHN WESLEY ROSS.

Witnesses:
　A. MADAN,
　M. MYERS.